US006914625B1

(12) United States Patent
Anderson et al.

(10) Patent No.: US 6,914,625 B1
(45) Date of Patent: Jul. 5, 2005

(54) METHOD AND APPARATUS FOR MANAGING IMAGE CATEGORIES IN A DIGITAL CAMERA TO ENHANCE PERFORMANCE OF A HIGH-CAPACITY IMAGE STORAGE MEDIA

(75) Inventors: Eric C. Anderson, San Jose, CA (US); Paul S. Chambers, San Jose, CA (US); John Pavley, Cupertino, CA (US)

(73) Assignee: IPAC Acquisition Subsidiary I, LLC, Peterborough, NH (US)

( * ) Notice: Subject to any disclaimer, the term of this patent is extended or adjusted under 35 U.S.C. 154(b) by 0 days.

(21) Appl. No.: 09/430,235

(22) Filed: Oct. 29, 1999

Related U.S. Application Data

(63) Continuation-in-part of application No. 09/121,760, filed on Jul. 23, 1998, now abandoned.

(51) Int. Cl.[7] .............................. H04N 5/228; H04N 5/76
(52) U.S. Cl. .................................. 348/222.1; 348/231.2; 348/231.9
(58) Field of Search ........................ 348/207.99, 207.1, 348/222.1, 231.99, 231.2, 231.3, 231.5, 231.6, 231.9, 333.03, 333.05, 333.11, 96; 715/526

(56) References Cited

U.S. PATENT DOCUMENTS

| 5,633,678 A | * | 5/1997 | Parulski et al. ........... 348/231.5 |
| 5,924,090 A | * | 7/1999 | Krellenstein .................... 707/5 |
| 6,154,755 A | * | 11/2000 | Dellert et al. ................ 715/526 |
| 6,538,698 B1 | * | 3/2003 | Anderson .............. 348/333.05 |
| 2002/0071028 A1 | * | 6/2002 | Ezawa .......................... 348/96 |
| 2002/0149676 A1 | * | 10/2002 | Hatori ..................... 348/207.1 |

* cited by examiner

Primary Examiner—Wendy R. Garber
Assistant Examiner—Luong T. Nguyen
(74) Attorney, Agent, or Firm—Swayer Law Group LLP (57) ABSTRACT

A method and apparatus for enhancing performance of a high-capacity storage media in a digital imaging device. The method aspect of the present invention includes, storing images on the storage media, where the images include tags for categorizing the images. A category list is generated from the tags in the images and the category list is stored on the storage media. A category within the category list is designated as a default category. The method further includes accessing the image category list in order to display the images, wherein only the images belonging to the default category are displayed, thereby speeding access to, and display of, the images.

19 Claims, 11 Drawing Sheets

FIG. 11

METHOD AND APPARATUS FOR MANAGING IMAGE CATEGORIES IN A DIGITAL CAMERA TO ENHANCE PERFORMANCE OF A HIGH-CAPACITY IMAGE STORAGE MEDIA

CROSS-REFERENCE TO RELATED APPLICATIONS

This Application is a continuation-in-part of U.S. patent application Ser. No. 09/121,760 filed on Jul. 23, 1998, now abandoned, entitled "System And Method For Automatic Analysis And Categorization Of Images In An Electronic Imaging Device," and assigned to the assignee of the present application.

FIELD OF THE INVENTION

The present invention relates to category management in a digital camera, and more particularly to a method and apparatus for managing image categories in a digital camera to enhance performance of a high-capacity image storage media.

BACKGROUND OF THE INVENTION

The use of digital cameras is becoming increasingly widespread. Captured digital images are typically stored in image files within the camera on some type of storage media, such as an internal flash memory, a removable hard drive, or on a removable flash memory card. One advantage over analog SLR cameras is that digital cameras allow the user to play back the captured images on a liquid-crystal display (LCD).

Typically, the images are displayed sequentially based on an image number or the time and date that the images were captured. When the number of stored images is large, the user has difficulty finding particular images, and sequentially navigating among the images during the search can be tedious and slow. Therefore, digital cameras are being provided with a categorization feature in which a user may categorize the images for easier sorting.

For example, U.S. Pat. No. 5,633,678 issued to Parulski discloses a digital camera in which image category icons are displayed on the LCD for selection by the user so that the user may choose an appropriate category before taking a group of pictures. Examples of categories are Family, Work, Vacation, and Pets, for instance. After the user selects a particular category and captures an image, the category name is stored as a tag in the image file along with the image data.

By the time this patent issues, some cameras on the market will allow a user to display captured images on the camera based on their associated categories (e.g., the DC290 by Eastman Kodak Co. incorporating the Digita Operating Environment by FlashPoint Technology Inc.). To implement this sort function, the camera must build an inventory list in memory indicating which images belong to which categories. The camera builds this inventory list by opening each image and extracting the category tags.

Due to the time required to open and read the category tags from each image file, it is more efficient to build the inventory list each time the camera is turned-on, rather than each time the user requests a sort. But even building the inventory list at cameras start-up is less than optimal because the process may significantly increase the boot-up time of the camera. Even with faster processors and disk access time, this problem may grow worse in the future due to the advent of high-capacity storage media.

For example, now available on the market are tiny disk drives for digital cameras having 340 MB of storage space. Anticipated sizes within a year exceed 1 GB. This is enough storage capacity to store well over one thousand very large JPEG images. The time required to access that many images from a high-capacity storage media each time the camera is turned-on in order to build an inventory list would be a significant barrier to the marketability and usability of the camera.

Accordingly, what is needed is an improved method for enhancing the performance of a high-capacity storage media in a digital imaging device. The present invention addresses such a need.

SUMMARY OF THE INVENTION

The present invention provides a method and apparatus for enhancing performance of a high-capacity storage media in a digital imaging device. The method aspect of the present invention includes, storing images on the storage media, where the images include tags for categorizing the images. A category list is generated from the tags in the images and the category list is stored on the storage media. A category within the category list is designated as a default category. The method further includes accessing the image category list in order to display the images, wherein only the images belonging to the default category are displayed, thereby speeding access to, and display of, the images. In a further aspect of the present invention, the image category list is synchronized with the images on the storage media when it has been determined that at least one image was deleted, added, or recategorized.

According to the system and method disclosed herein, the present invention

DETAILED DESCRIPTION

The present invention relates to category management in a digital camera. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any digital imaging device which captures, stores, or displays digital images, could incorporate the features described below and that device would be within the spirit and scope of the present invention. Thus, the present invention is not intended to be limited to the embodiment shown but is to be accorded the widest scope consistent with the principles and features described herein.

Figure 1:
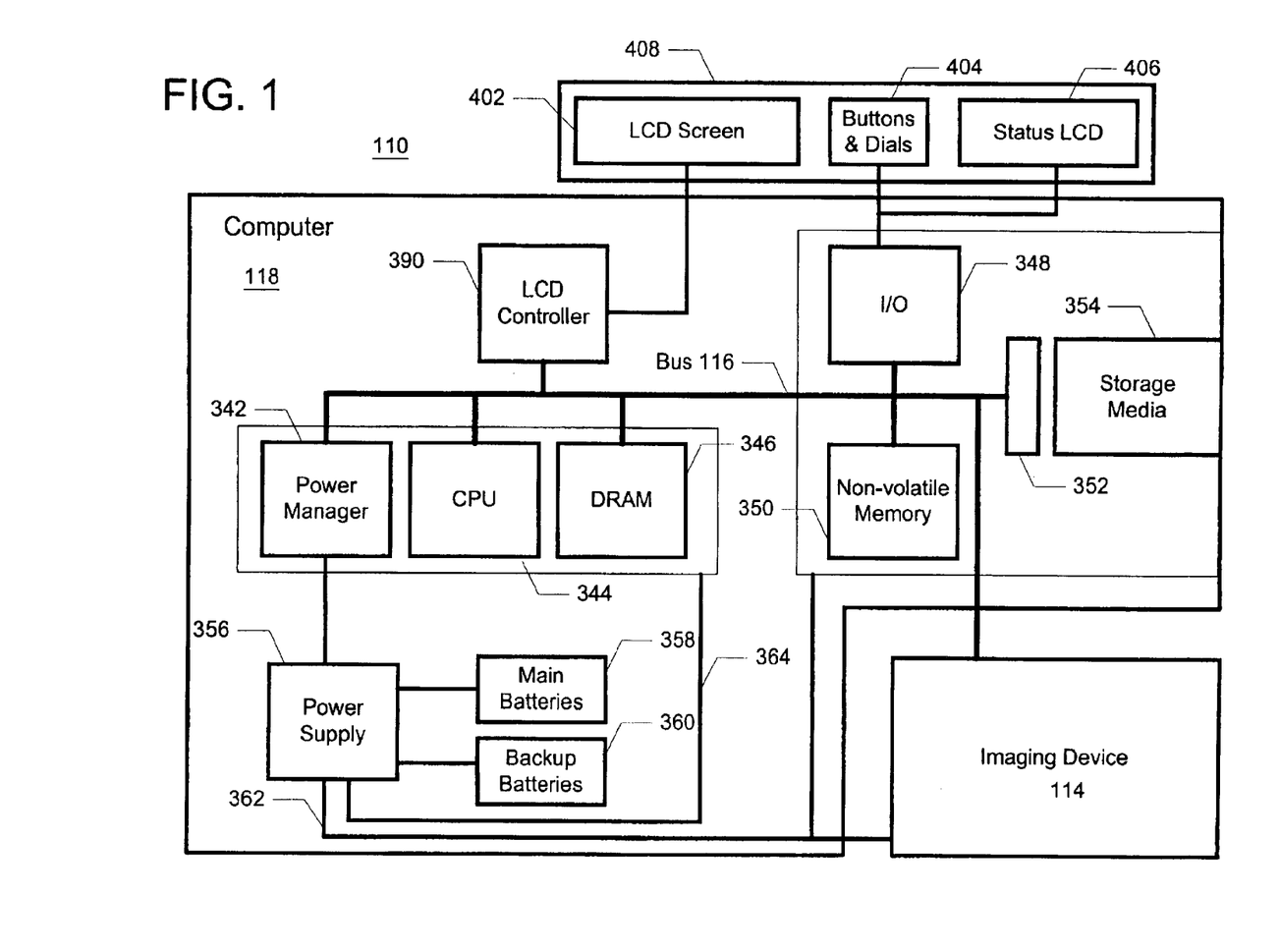
FIG. 1 is a block diagram of one preferred embodiment of a digital camera 110 system for use in accordance with the present invention.

Referring now to FIG. 1, a block diagram of one preferred embodiment of a digital camera 110 system is shown for use in accordance with the present invention. Camera 110 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect a removable memory 354 to system bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 344 runs an operating system that includes a menu-driven GUI and provides image processing through software, rather than hardware. An example of such software is the Digita™ Operating Environment by FlashPoint Technology of San Jose, Calif. Although CPU 344 is preferably a microprocessor, one or more DSP's (digital signal processor) or ASIC's (Application Specific Integrated Circuit) could also be used.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408. Non-volatile memory 350, which may typically comprise a conventional read-only memory or flash memory, stores a set of computer-readable program instructions to control the operation of camera 110.

Storage media 354 stores image data and is preferably a non-volatile device, such as a flash disk, readily removable and replaceable by a camera 110 user via buffers/connector 352. In place of a flash disk, the storage media 354 could be a mini hard disk, such as IBM's 340 MB Micro Drive™. And instead of being removable, the storage media 354 could be permanently affixed in the camera 110 provided it had sufficient storage capacity, such as 1 GB, for example.

Power supply 356 supplies operating power to the various components of camera 110. Power manager 342 communicates with power supply 356 and coordinates power management operations for camera 10. In the preferred embodiment, power supply 356 provides operating power to a main power bus 362 and also to a secondary power bus 364. The main power bus 362 provides power to imaging device 114, I/O 348, non-volatile memory 350 and storage media 354. The secondary power bus 364 provides power to power manager 342, CPU 344 and DRAM 346. Power supply 356 is connected to main batteries 358 and also to backup batteries 360. In the preferred embodiment, a camera 110 user may also connect power supply 356 to an external power source.

Dynamic Random-Access-Memory (DRAM) 346 is a contiguous block of dynamic memory that may be selectively allocated for various storage functions. DRAM 346 may store both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. After processed image data has been stored in DRAM 346, LCD controller 390 transfers the image data to LCD screen 402 for display.

Figure 2A:
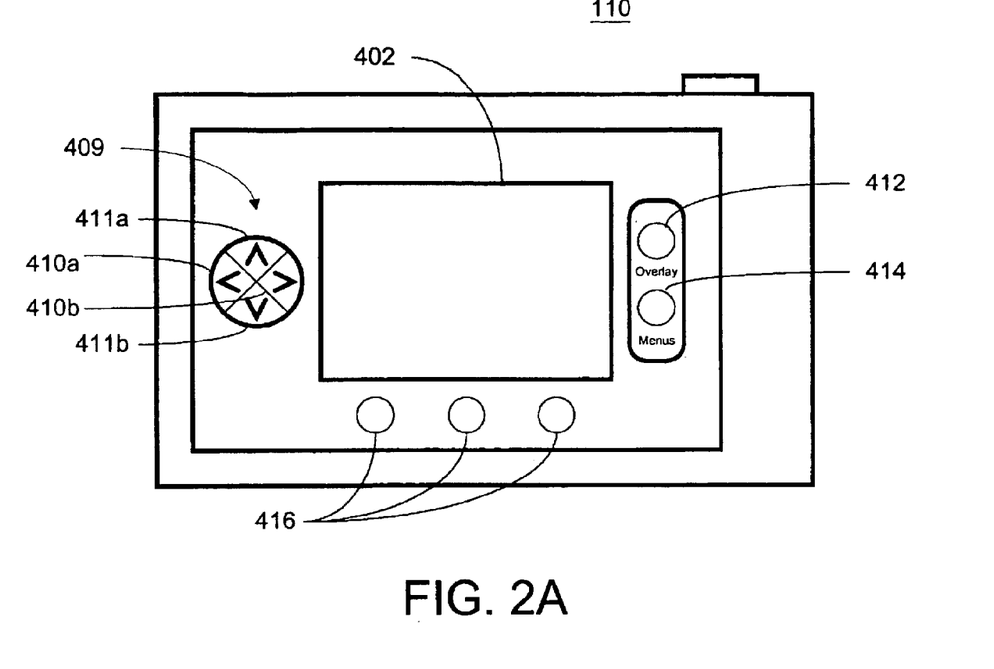
FIGS. 2A and 2B are diagrams depicting exemplary hardware components of the camera's user interface.
Figure 2B:
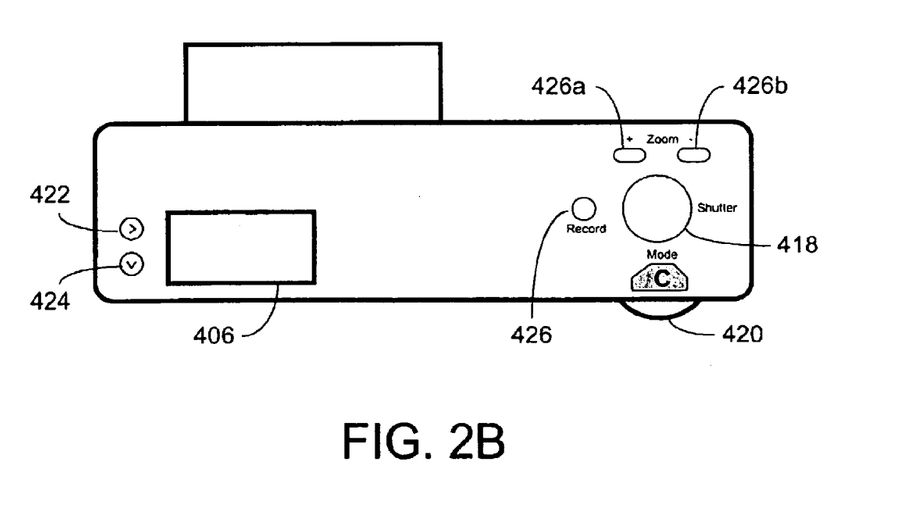

FIGS. 2A and 2B are diagrams depicting exemplary hardware components of the camera's user interface 408. FIG. 2A is back view of the camera 110 showing the LCD screen 402, a four-way navigation control button 409, an overlay button 412, a menu button 414, and a set of programmable soft keys 416. FIG. 2B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The camera operates in at least two modes, capture mode for capturing images, and play mode for playing back the captured images on the LCD screen 402. During capture mode, when the user presses the shutter button to capture an image, the imaged data is captured at a resolution set by user, transformed into YCC 4:2:2 color space, compressed (e.g. JPEG), and stored as an image file. The user may then continue to capture images or switch the camera 110 to play mode to playback and view the previously captured images on the LCD screen 402.

In play mode, images are displayed on the LCD screen 402 either individually or in arrays of two, four, or nine images. Images may be manually categorized by the user either pre-capture or post capture. Categorizing images pre-capture is done by selecting a category icon displayed on the camera and then capturing a series of images. Categorizing images post capture is done by selecting captured images during playback and choosing a category for the image. In either case, the name of the chosen category is stored in the image files as a tag.

Figure 3:
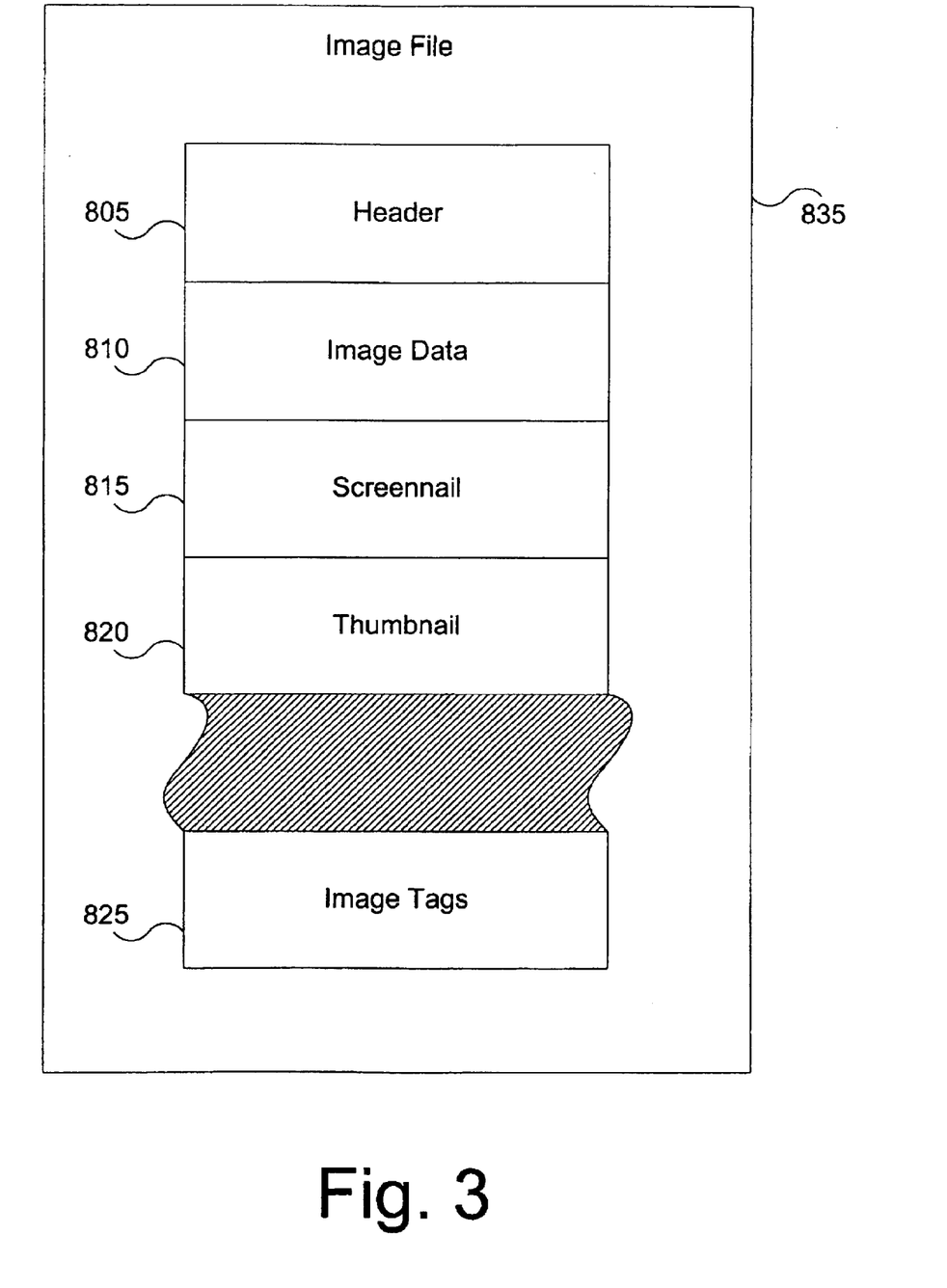
FIG. 3 is a diagram of an example an image file.

Referring now to FIG. 3, a diagram of an example an image file 835 is shown. The exemplary image file 835 includes a header 805, image data 810, a screennail 815, a thumbnail 820, and image tags 825.

Header 805 preferably includes information that identifies and describes the various contents of image file 835. Image data 810 contains actual captured image data. Image data 810 exists in whichever format that is appropriate for the current location of image file 835 within the image processing chain of camera 110. Screennail 815 and thumbnail 820 are each different versions of image data 810 that have varying degrees of reduced resolution for a number of special viewing applications.

Image tags 825 includes various types of information that correspond and relate to particular captured image data 810. Image tags 825 are further discussed below in conjunction with FIG. 4.

Figure 4:
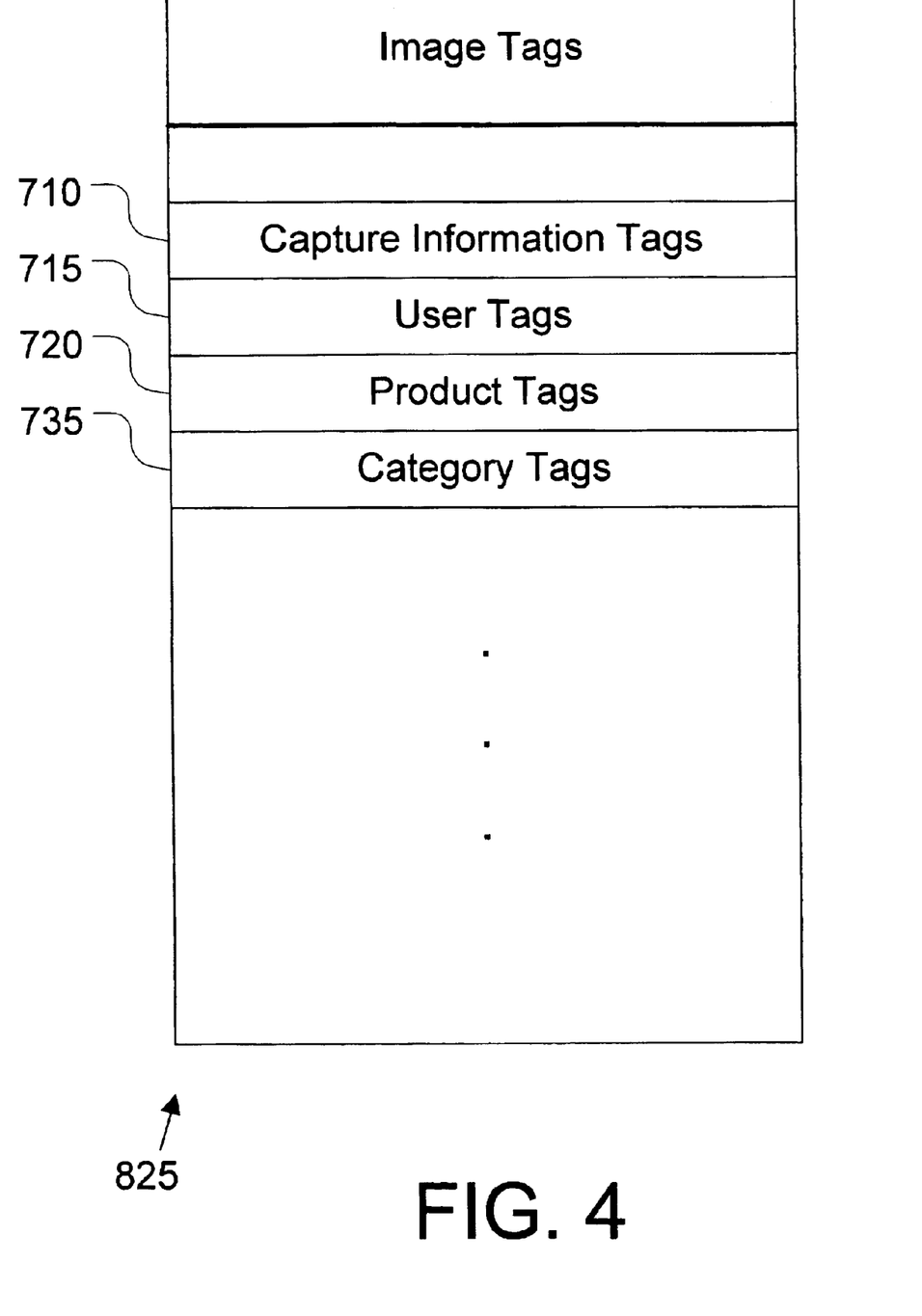
FIG. 4 is a diagram of one embodiment for the image tags of FIG. 3.

Referring now to FIG. 4, a diagram of one embodiment for the image tags of FIG. 3 is shown. In the FIG. 4 embodiment, image tags 825 include capture information tags 710, user tags 715, product tags 720, and category tags 735.

Figure 8:
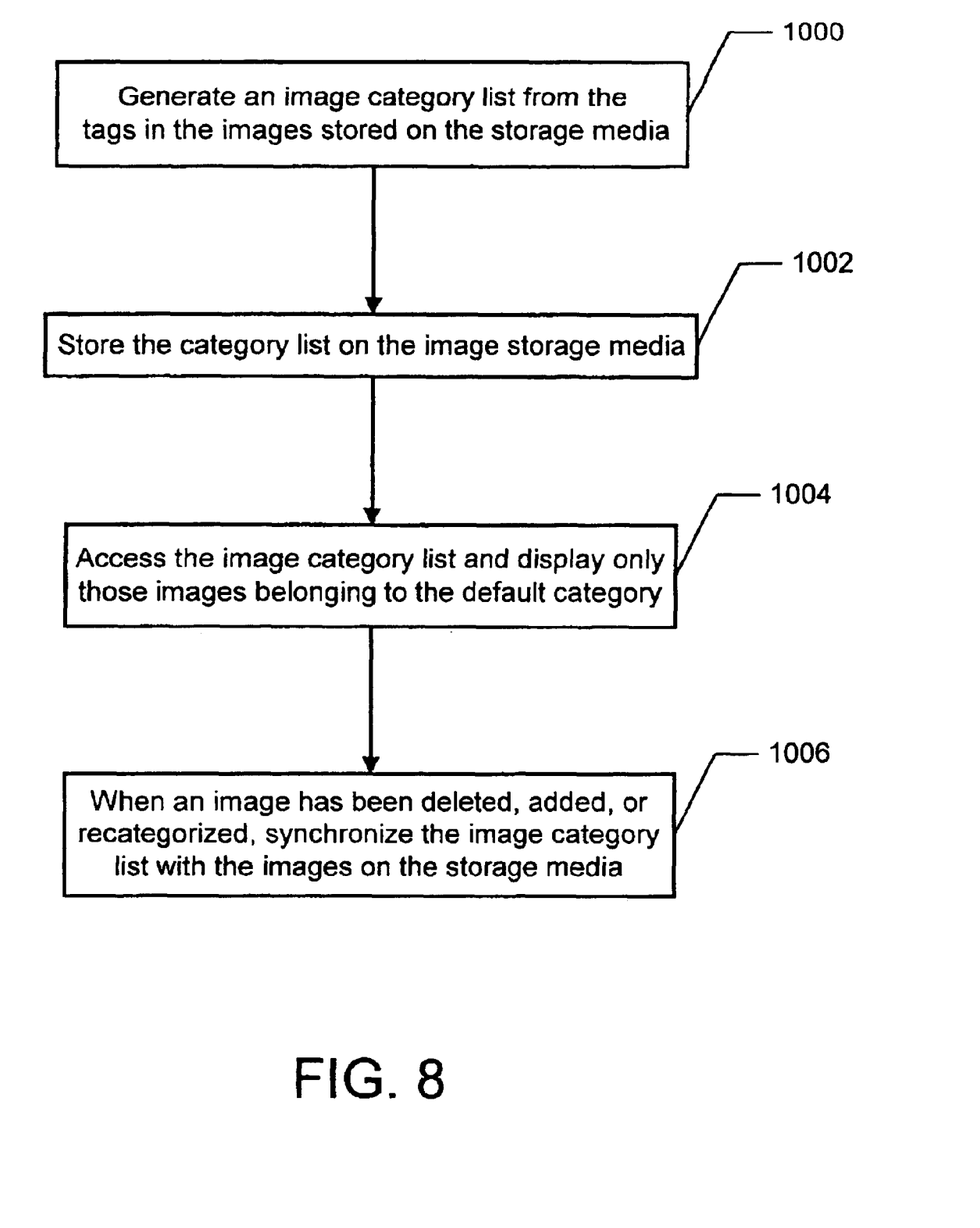
FIG. 8 is a flow chart illustrating the process of enhancing the performance of a high-capacity storage media in a digital imaging device.

Capture information tags 710 preferably include various types of information that correlate with the captured image data 810 (FIG. 8). For example, capture information tags 710 may indicate date and time of capture, focus setting, aperture setting, and other relevant information that may be useful for effectively processing or analyzing the corresponding image data 810. User tags 715 and product tags 720 typically contain various other information that may be needed for use with camera 110. In the preferred embodiment, category tags 735 are initially sixteen empty locations in which new category tags may be stored, as explained further below.

In conventional cameras that include manually applied categories, upon turning-on the digital camera, the camera must search for and open each image file stored on the storage media to load the image tags into memory to keep track of which images belong to which categories. After the category information has been loaded into memory, the digital camera sorts the images chronologically based on the date and time tags and displays the first or last N images on the LCD screen 402. Due to the length of time it may take for the digital camera to perform this operation when a high-capacity storage media containing a large number of images is used, the boot-up time of the digital camera may be significantly lengthened.

According to the present invention, the digital camera is provided with an improved categorization function. The categorization function of the present invention not only allows the user to manually apply categories to images, but also includes categorization software for both automatically categorizing images and for permanently storing the image category information in a category list on the storage media as a means for managing the stored images. In a preferred embodiment, the categorization software may be loaded into DRAM 346 from storage media 354 or another external source, or be included as part of the camera's operating system, which is stored in nonvolatile memory 350.

Figure 5:
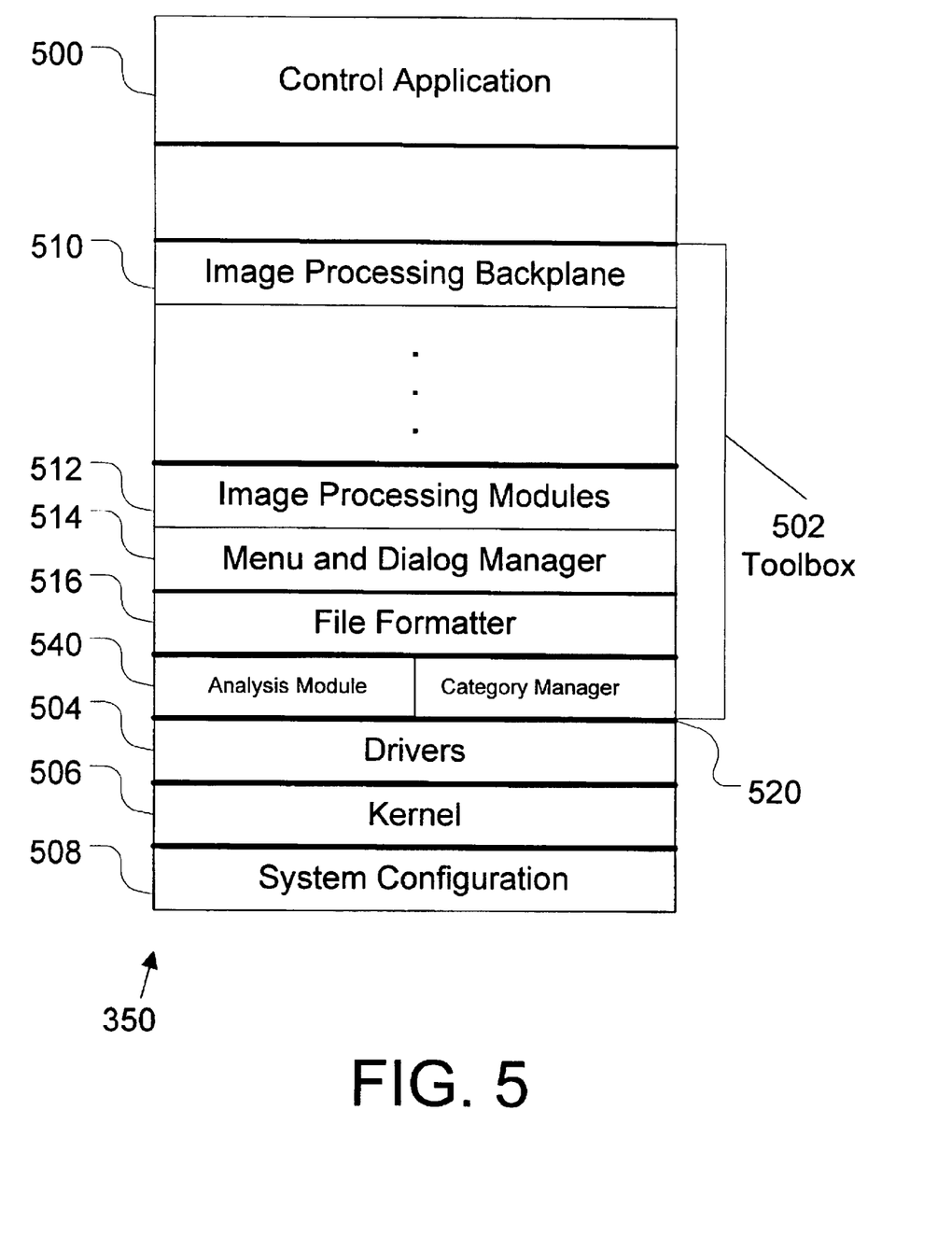
FIG. 5 is a diagram of the non-volatile memory in the embodiment where categorization software is included as part of the operating system.

Referring now to FIG. 5, a diagram of the non-volatile memory 350 is shown in the embodiment where categorization software is included as part of the operating system. The FIG. 5 diagram includes control application 500, toolbox 502, drivers 504, kernel 506, and system configuration 508. Control application 500 comprises program instructions for controlling and coordinating the various functions of camera 110. Toolbox 502 contains selected function modules including image processing backplane 510, image processing modules 512, menu and dialog manager 514, file formatter 516, analysis modules 540, and a category manager 520.

The analysis modules 540 are software routines for automatically analyzing and categorizing images as the images are captured. The category manager 520 creates and maintains a permanent category list listing which images belong to which categories. The analysis modules 540 and the category manager 520 are described in further detail below.

Image processing backplane 510 includes software routines that coordinate the functioning and communication of various image processing modules 540 and handle the data flow between the various modules. Image processing modules 540 preferably include selectable plug-in software routines that manipulate captured image data in a variety of ways, depending on the particular modules selected. Menu and dialog manager 514 includes software routines which provide information for controlling access to camera control menus for access to features in camera 110. File formatter 516 includes software routines for creating an image file from the processed image data.

Drivers 504 control various hardware devices within camera 110 (for example, motors 234). Kernel 506 provides basic underlying services for the camera 110 operating system. System configuration 508 performs initial start-up routines for camera 110, including the boot routine and initial system diagnostics.

Figure 6:
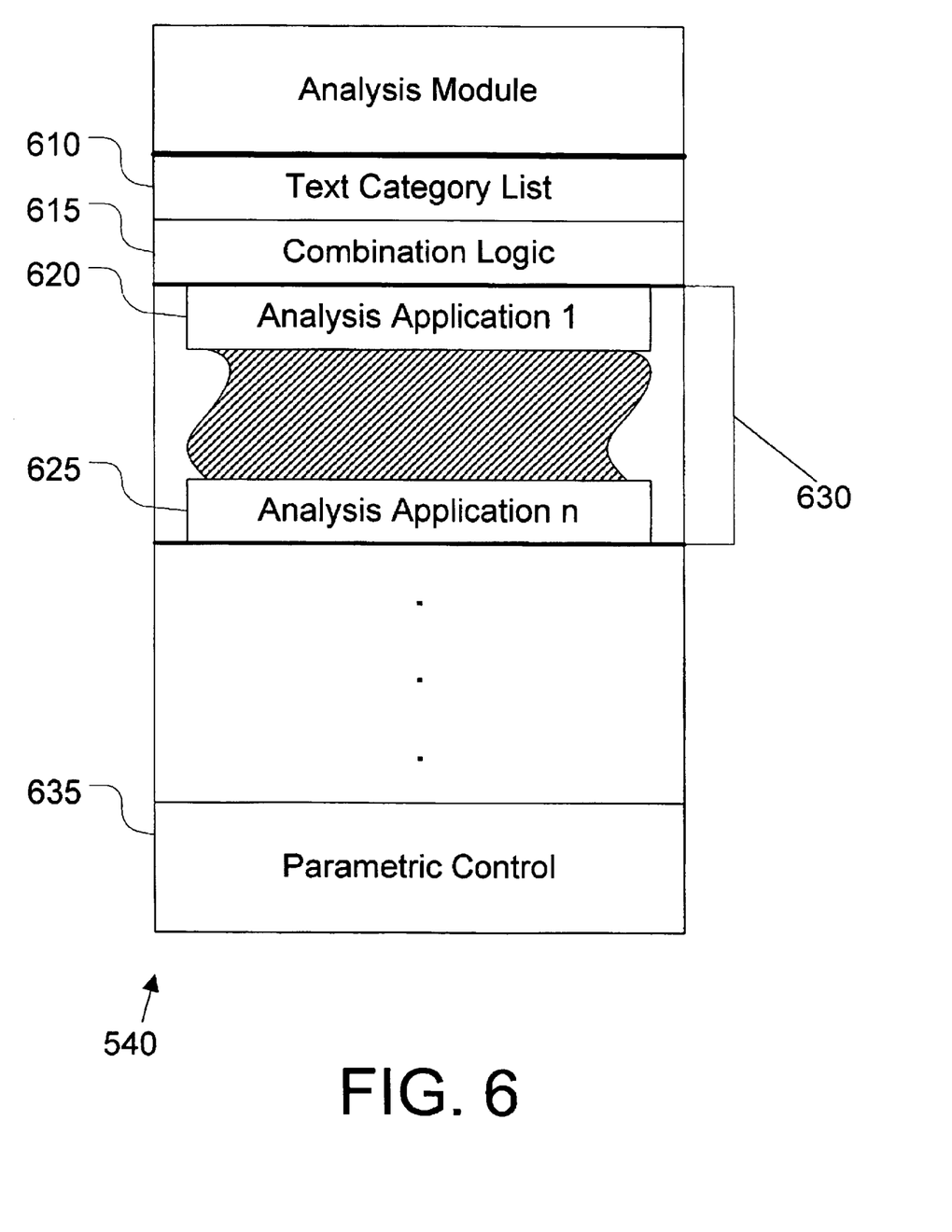
FIG. 6 is a diagram of one embodiment for a single analysis module that automatically analyzes and categorizes images upon capture.

Referring now to FIG. 6, a diagram of one embodiment for a single analysis module 540 that automatically analyzes and categorizes images upon capture is shown. Analysis module 540 includes text category list 610, combination logic 615, analysis algorithms 630, and parametric control 635.

Analysis algorithms 630 are a series of software routines ranging from analysis algorithm 1 (620) through analysis algorithm n (625.) Analysis algorithms 630 are each designed to allow analysis module 540 to access and analyze images at various stages in the processing chain of camera 110, in order to gather information about the image for later categorization.

Combination logic 615 determines how to resolve the results of the image analysis when multiple analysis algorithms 630 are utilized. Parametric control 635 is used to control settable parameters for analysis module 540. For example, analysis module may be turned on/off, or sensitivity settings for analysis module 540 may be controlled with parametric control 635.

Typically, each analysis algorithm 630 is designed to detect at least one image category. For example, individual analysis algorithms 630 may be designed to detect a person or groups of people based on characteristics like substantial amounts of flesh tones within the image. Individual analysis algorithms 630 may likewise be designed to detect nature scenes from characteristics like substantial green content in the image combined with the relative lack of hard edges. Similarly, categories like city images, water images or indoor images may be detected by characteristic features contained in those images. Once the last line of image data from a given image is processed, analysis module 540 then preferably generates one or more category tags that correspond to the particular image, and the generated category tags are stored as part of the image file. A user of camera 110 may thus readily utilize the category tags to efficiently access and sort images into selected categories. Text category list 610 is a listing of the various possible image categories that a given analysis module 540 may assign to an image.

Figure 7:
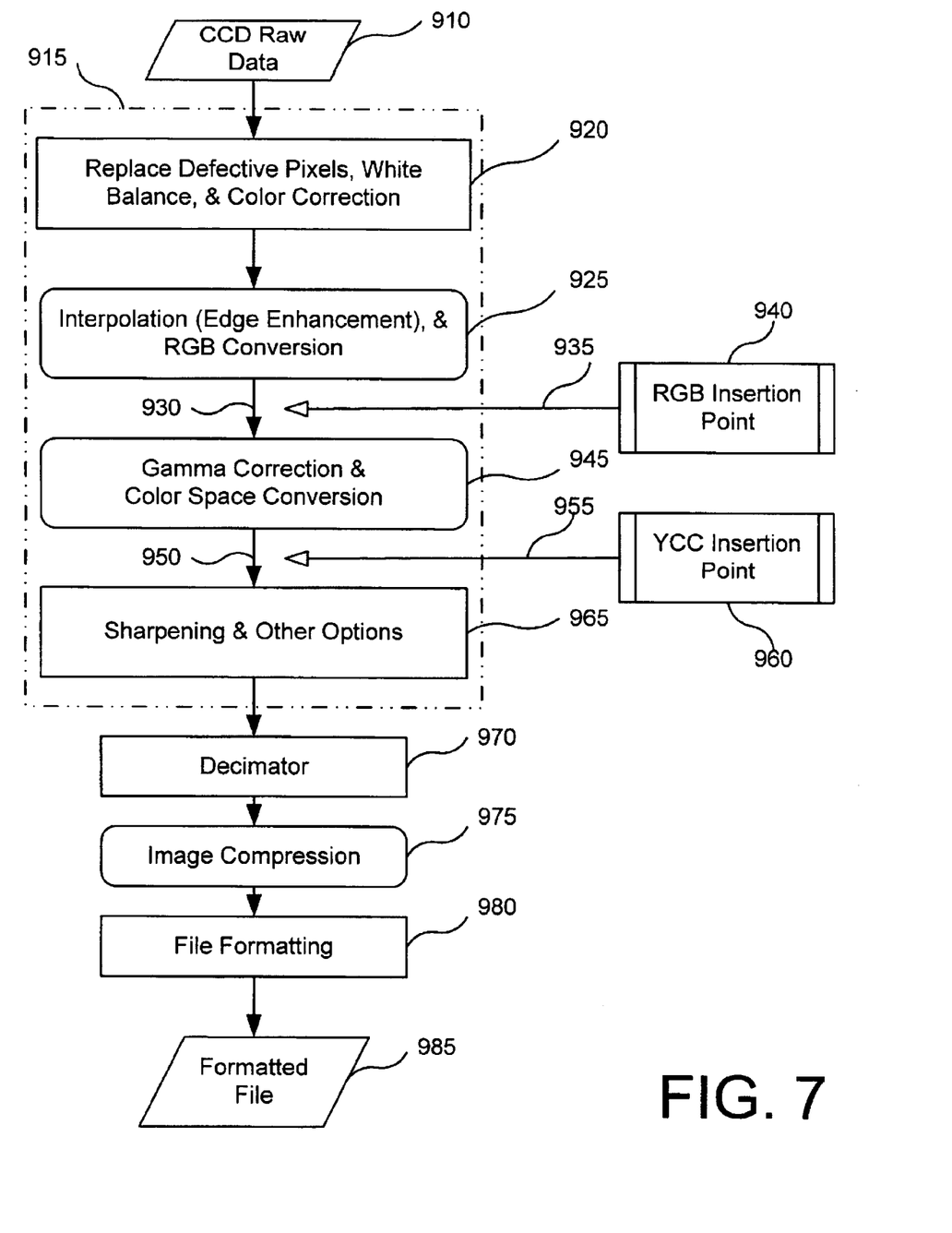
FIG. 7 is a flowchart is shown for one embodiment of method steps to automatically analyze and categorize images, according to the present invention.

Referring now to FIG. 7, a flowchart is shown for one embodiment of method steps to automatically analyze and categorize images, according to the present invention. FIG. 7 also details the operation of a series of plug-in image processing modules 512 for processing and formatting image data 810. However, in other embodiments of camera 110, various other modules may readily be substituted or added to those modules discussed in below conjunction with the FIG. 7 embodiment.

Initially, in step 910, camera 110 preferably captures a selected image as CCD raw data, stores the raw data as image data 810 into image file 835, and then propagates image file 835 through camera 110 for processing and formatting of the image data 810. In step 920, an image processing module 512 preferably replaces any defective pixels in image data 810, and also performs white balance and color correction on image data 810. Next, in step 925, another image processing module 512 preferably performs interpolation (edge enhancement) on image data 810, and then converts image data 810 into an intermediate format. In the preferred embodiment, step 925 converts image data 810 into an RGB (Red, Blue, Green) format.

In the FIG. 7 embodiment, following step 925, selected analysis modules 540 may be plugged into an RGB insertion point 940 to advantageously analyze image data 810 at RGB transition point 930, in accordance with the present invention. One, some, or all of the analysis modules 540 may analyze image data 810 at RGB transition point 930. Preferably, analysis modules 540 are selected for optimal compatibility and effectiveness with the current format of image data 810 at RGB transition point 930. Once a particular analysis module 540 analyzes the final line of image data 810, then that analysis module 540 preferably generates any appropriate category tags 735 and stores the generated category tags 735 into a blank category tag location in image file 835. Then, camera 110 may subsequently access the stored category tags 735 to automatically categorize and utilize the individual stored images (which each correspond to a separate image file 835).

Next, in step 945, another image processing module 512 preferably performs gamma correction and color space conversion on image data 810. In the FIG. 7 embodiment, image data 810 is converted to YCC 444 (Luminance, Chrominance-red, and Chrominance-blue) format.

In the FIG. 7 embodiment, following step 945, selected analysis modules 540 may be plugged into a YCC insertion point 960 to analyze image data 810 at YCC transition point 950, in accordance with the present invention. One, some, or all of the analysis modules 540 may analyze image data 810 at YCC transition point 950. As discussed above, once a particular analysis module 540 analyzes the final line of image data 810, then that analysis module 540 preferably generates any appropriate category tags 735 and stores the generated category tags 735 into a blank category tag location in image file 835 for subsequent use by camera 110 to automatically categorize captured images.

This discussion of the FIG. 7 embodiment specifically refers only RGB insertion point 940 and YCC insertion point 960. However, in other embodiments of the present invention, analysis modules 540 may readily analyze image data 810 at any other time or insertion point within camera 110. For example, in an alternate embodiment, analysis modules 540 may readily be configured to examine image data 810 at capture time, and to specifically recognize and identify the capture of any image that matches one or more selectable parameters.

Furthermore, in another embodiment, analysis modules 540 may advantageously access image files 835 that have been processed and stored onto storage media 354. Analysis modules 540 may then automatically categorize the image files 835 by analyzing image data 810 and responsively generating corresponding category tags 735, in accordance with the present invention.

In step 965, an image processing module 512 preferably performs a sharpening procedure on image data 810, and also may perform a variety of other processing options. Then, in step 970, an image processing module 512 preferably decimates image data 810. In the preferred embodiment, the decimation process reduces image resolution by decimating the YCC 444 image data to produce YCC 422 or YCC 411 image data In step 975, the image data 810 is preferably compressed into a final image format (preferably JPEG.) Next, in step 980, file formatter 516 preferably formats the compressed image file 835, and the resulting image file 835 is finally saved into storage media 354 in step 985. As discussed above, image file 835 thus includes any appropriate category tags which camera 110 may then subsequently automatically access to sort selected images, in accordance with the present invention.

As stated above, in a second aspect of the present invention, the category manager 520 creates and maintains a category list on the storage media 354 as a way for managing and accessing a large quantity of images to thereby enhance the performance of the storage media 354.

Referring now to FIG. 8, a flow chart illustrating the process of enhancing the performance of a high-capacity storage media 354 in a digital imaging device is shown. The process begins by generating an image category list from the image tags contained in the image files stored on the storage media 354 in step 1000. Rather than creating the image category list every time the camera 110 is turned-on, the category manager 520 of the present invention creates a category list once and stores the category list on the storage media 354 in step 1002, and as shown in FIG. 8. In a preferred embodiment, the category list is created the first time a storage media 354 not containing a category list is inserted into the camera 110.

Figure 9:
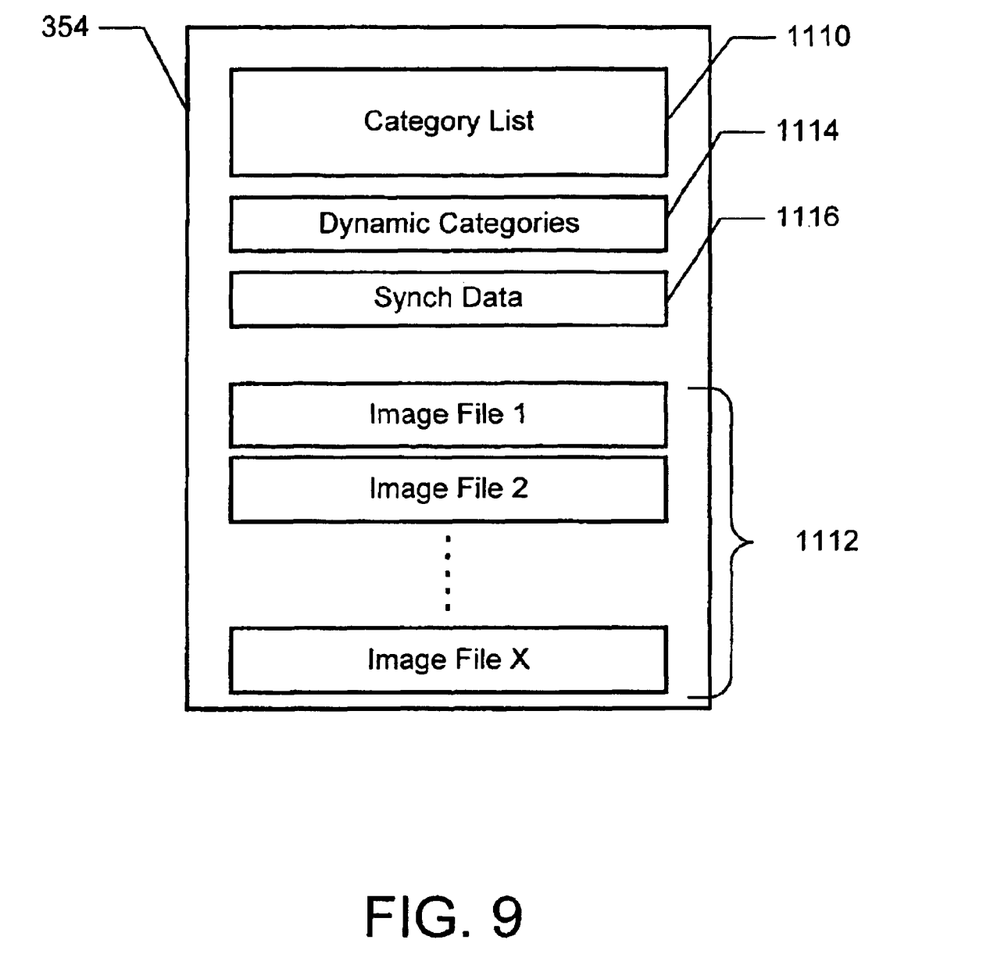
FIG. 9 is a diagram of storage media including a category list and stored image files.

FIG. 9 is a diagram of storage media 354 including a category list 1110 and stored image files 1112. The category list 1110 is a file that contains a list of all images that have a category assigned to them, either by the system using automatic categories, or by the user using manual categories.

The category list 1110 may be organized using various formats. The easiest implementation is a table of category names and corresponding pathnames of the image files containing a particular category. A more efficient approach is to use a directory like method, which eliminates replicating the entire pathname for each image. This allows shorter entries in the table, saving disk space and more importantly, memory space when the table is loaded from the storage media 354 into memory. Another approach is to use a multimedia file type, such as QuickTime sparse format, where the list is effectively encoded as a slide show, using external filenames to locate the image files, rather than including the image files within a QuickTime movie file. Using a multimedia file type will result in a larger category list 1110 any other approaches, but has the advantage allowing the user to "view" available categories on a personal computer as a movie. In a preferred embodiment, the category list 1110 is stored in a system folder on the storage media 354. As will be appreciated by those with ordinary skill in the art, many other embodiments are also possible.

In accordance with the present invention, the category manager 520 also creates dynamic categories 1114 from the date and time tag in the image files. These dynamic categories are then used by the camera 110 to display images upon startup, rather than reading each image file to sort them by date and time. Examples of dynamic categories that may be created from the date and time tag are: "recent", "this week", "last week", "this month", "last month", "this year", "last year", and "all". The names of the dynamic categories are self-explainable. For instance, the recent category is used to display N of the latest images captured. In a preferred embodiment, the recent category is set by default to display fifty images, but may be adjusted by the user.

Referring again to FIG. 8, after the category list 520 has been stored, the image category list 520 is accessed and only those images belonging to the default category are displayed in step 1004. This occurs when the camera 110 is first turned on and whenever images are to be displayed. In a preferred embodiment, the default category is the recent category. By displaying images that only belong to the default category, the present invention eliminates the requirement of the camera 110 having to exhaustively search, sort, and display all of the images on the storage media 354 based on date and time. Consequently, the time required to boot the camera 110 and display images is dramatically reduced.

Once images are displayed on the camera 110, the user may change which images are displayed by changing the category currently displayed. In a preferred embodiment, the user may instruct the camera to display a menu of category names on the camera's GUI and then select a particular category name using the user interface of the camera 110. Once a particular category is selected, those images indexed in the category list 1110 under the selected category are displayed. If the user selects more than one category, only the image files that include all the selected categories are displayed.

Once a category list 1110 has been created from a set of images on the storage media 354, the contents of the storage media 354 may be modified, causing synchronization problems between the category list 1110 and the images on the storage media 354. Therefore, when it has been determined that at least one image on the storage media 354 has been deleted, added, or recategorized, the image category list 1110 is synchronized with the images on the storage media 354 in step 1006.

According to the present invention, there are two types of synchronization, contemporaneous and subsequent. Contemporaneous synchronization occurs when the contents of the storage media 354 are modified while the storage media 354 is under control of the digital camera 110. In this case, the category manager 520 automatically updates the category list 1110 as images are added, deleted and recategorized. Often times, however, the contents of the storage media 354 may be modified while the storage media 354 is under control of an external device, such as a PC. When the digital camera 110 regains control of the storage media 354, synchronizing the category list 1110 with the images on the storage media 354 must occur after the modifications to the images have been made. Hence the term subsequent synchronization.

Figure 10:
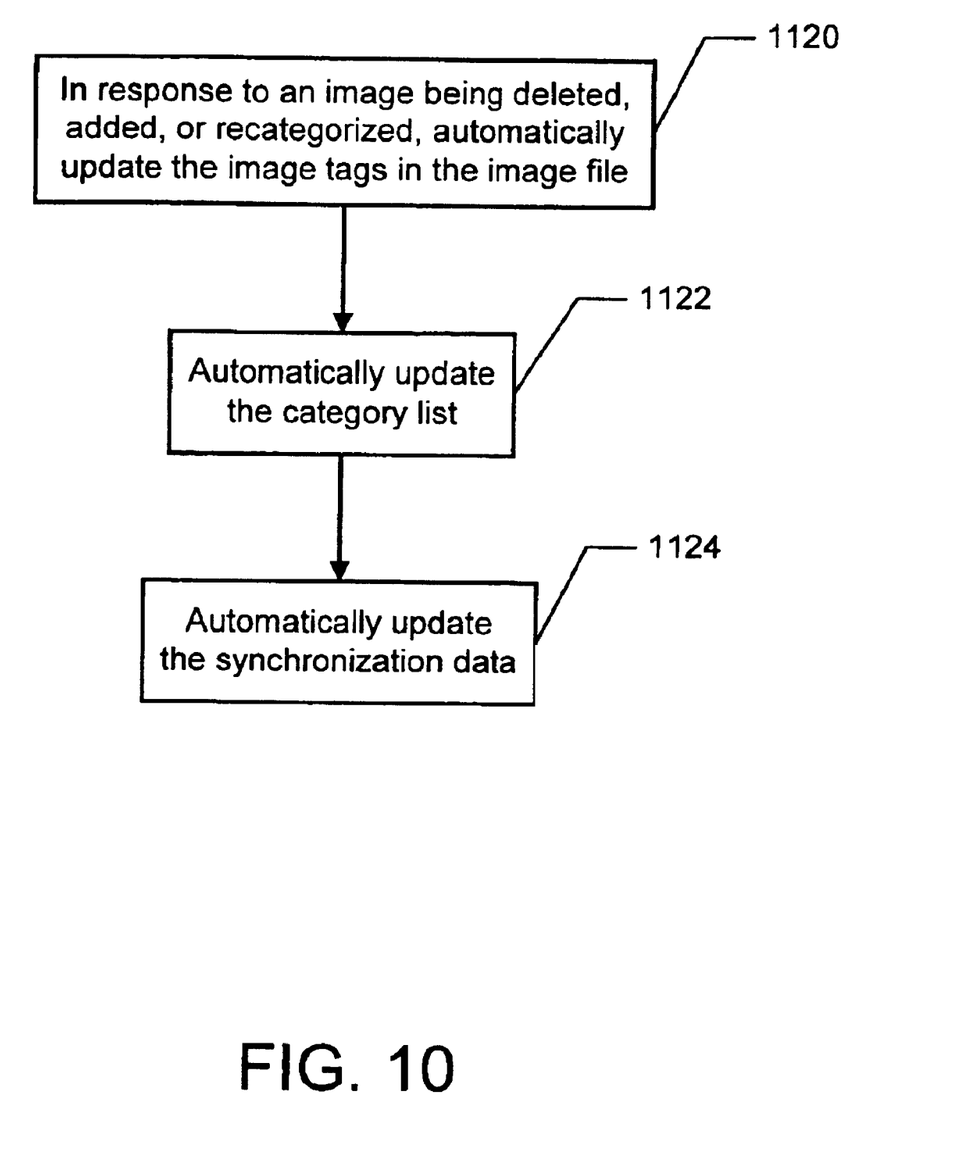
FIG. 10 is a flow chart illustrating the process of updating the category list during contemporaneous synchronization in accordance with the present invention.

FIG. 10 is a flow chart illustrating the process of updating the category list 1110 during contemporaneous synchronization. In response to an image being deleted, added, or recategorized, the image tags in the image file are automatically updated in step 1120. The category list 1110 is then automatically updated to reflect these modifications in step 1122. Finally, synchronization data 1116 is automatically updated as well in step 1124.

In a preferred embodiment, the synchronization data 1116 is the value of the remaining storage space on the storage media 354 after a synchronization event has occurred. The synchronization data 1116 is updated by making a call to the operating system for the number of blocks free on the storage media 354. The value returned is then stored on the storage media 354 as the synchronization data 1116. The synchronization data 1116 is then used to detect when a subsequent synchronization is necessary by comparing the saved storage space with the current storage space remaining. A difference in the two values may be used to indicate that the contents of the storage media 354 have been modified since the last synchronization. If supported by the camera system, a volume last date change, which indicates the last date the volume on the storage media 354 was changed, may also be used as the synchronization data 1116. Other methods are also possible.

A subsequent synchronization occurs in response to the contents of the storage media 354 being modified via an external device, such as a personal computer (PC). As an example, the user may remove the storage media 354 from the camera 110 and insert it into a PC, or connect the digital camera 110 to a PC, in which case the digital camera 110 loses control of the storage media 354. After the storage media 354 has been modified by a device that has no knowledge of the category list 1110, the category list 1110 will no longer accurately reflect the contents of the storage media 354.

Therefore, after it has been determined that at least one image was deleted, added, or recategorized when the storage media 354 was under control of an external device, the user is requested to initiate a synchronization of the image category list 1110 via a prompt on the camera 110. Alternatively, the subsequent synchronization process may be performed in the background assuming that the digital camera 110 has the necessary processing power to do so.

Upon initiation of a subsequent synchronization, the storage media 354 is scanned for image files, and each image file is opened to extract the user tags 715 and category tags 735 (FIG. 4), while the date and time tag is extracted to generate the dynamic categories 1114 (FIG. 9). This type of synchronization is not performed automatically upon detection that an image was modified outside control of the camera 110 because rebuilding the category list 1110 could take several minutes, during which time the user would be prevented from taking pictures.

Referring again to FIG. 9, the category manager 520 determines a subsequent synchronization is necessary after control over the storage media 354 is returned to the camera 110 by storing synchronization data 1114 on the storage media 354 with the category list 1110.

Figure 11:
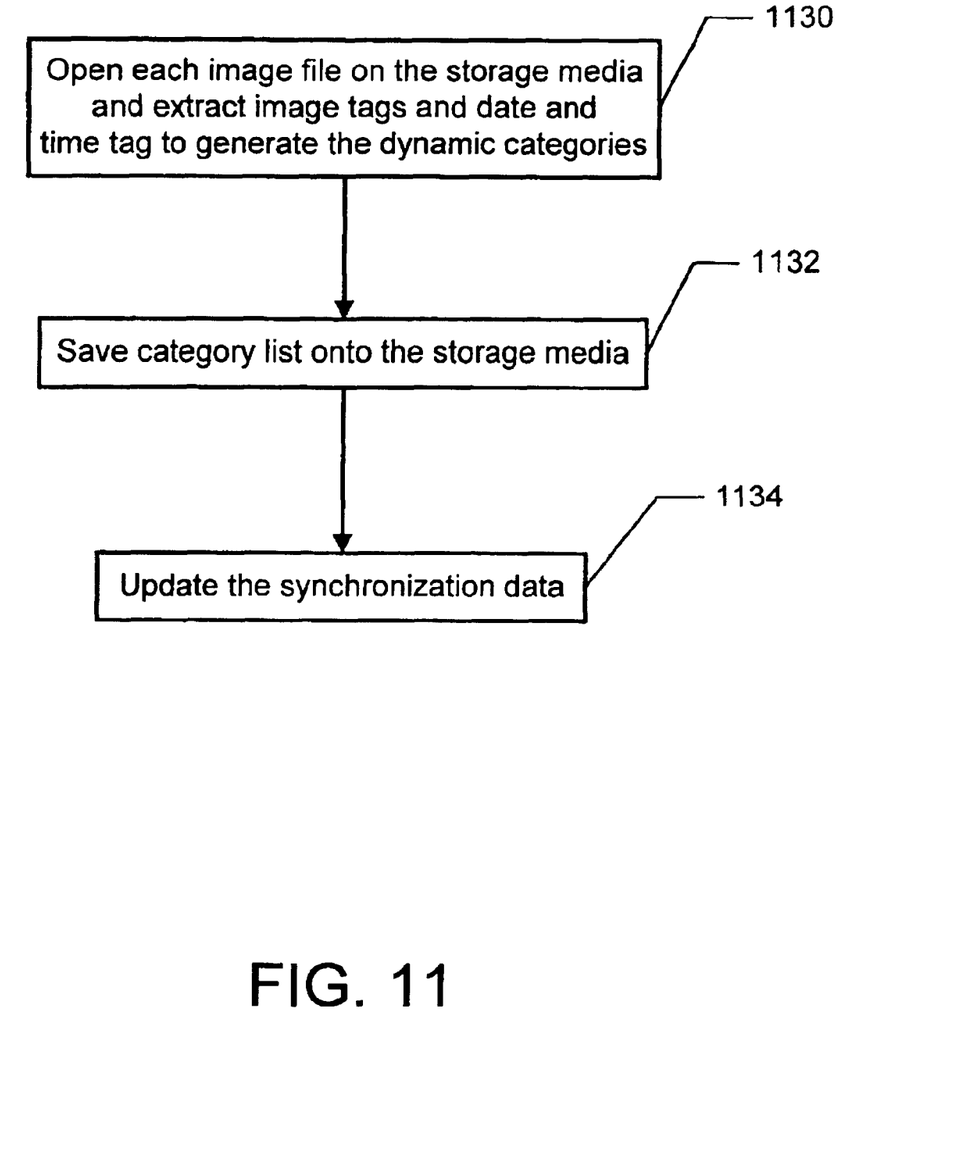
FIG. 11 is a flow chart illustrating the subsequent synchronization process in accordance with the present invention.

FIG. 11 is a flow chart illustrating the subsequent synchronization process in accordance with the present invention. As stated above, the process begins by opening each image file on the storage media 354 to extract the image tags, and to extract the date and time tag to generate the dynamic categories 1114 in step 1130. Thereafter, the category list 1110 is saved onto the storage media 354 in step 1132 and the synchronization data is updated in step 1134.

In an alternative embodiment where the digital camera includes a file system that associates an archived bit with each file, the subsequent synchronization process may be improved. Typically, a file system clears the archived bit of a file every time a file is opened for writing. According to the present invention, after the synchronization data 1116 is used to detect that a subsequent synchronization is necessary, the archived bit may be used as an indication that an image file was added to the storage media 354 or recategorized. Instead of reading each file on the storage media 354 during a subsequent synchronization, the archived bit of each file is checked and only those files whose archived bit has been cleared are read, thereby significantly increasing the speed of the process. After the tags are read from the image files, the archive bits for those files are reset.

A method and apparatus for managing image categories in a digital camera to enhance performance of a high-capacity image storage media has been disclosed. The present invention has been described in accordance with the embodiments shown, and one of ordinary skill in the art will readily recognize that there could be variations to the embodiments, and any variations are would be within the spirit and scope of the present invention.

For example, the present invention may be implemented in other types of digital imaging devices, such as an electronic device for archiving images that displays stored images on a television, for instance. In addition, software written according to the present invention may be stored on a computer-readable medium, such as a storage media, or transmitted over a network, and loaded into the digital camera for execution. Accordingly, many modifications may be made by one of ordinary skill in the art without departing from the spirit and scope of the appended claims.

What is claimed is:

1. A method for enhancing performance of a high-capacity storage media in a digital imaging device, comprising:
   a) storing images on the storage media, the images including tags for categorizing the images;
   b) generating an image category list from the tags in the images and storing the category list on the storage media, the image category list including a default category;
   c) accessing the image category list in order to display the images, wherein only the images belonging to the default category are displayed, thereby speeding access to, and display of, the images; and
   d) synchronizing the image category list with the images on the storage media when it has been determined that at least one image was deleted, added, or recategorized, wherein the synchronization includes,
      i) automatically synchronizing the image category list when the storage media is under control of the digital imaging device, and
      ii) performing a subsequent synchronization of the image category list after it has been determined that at least one image was deleted, added, or recategorized when the storage media was under control of an external device.

2. The method of claim 1 wherein step b) further includes the step of:
   i) generating dynamic categories from the tags.

3. The method of claim 2 wherein one of the tags indicates a date of image capture, step a) further including the step of:
   i) setting thresholds for the date to automatically create the dynamic categories.

4. The method of claim 3 wherein step a) further includes the step of:
   ii) providing a recent category that displays N of latest images captured.

5. The method of claim 1 further including the step of:
   d) allowing a user to select a category in the image category list to change which images are being displayed.

6. The method of claim 5 wherein step d) further includes the step of:
   i) allowing the user to change the default category.

7. A system for enhancing performance of a high-capacity storage media in a digital imaging device, comprising:
   means for storing images on the storage media, the images including tags for categorizing the images;
   means for generating an image category list from the tags in the images and storing the category list on the storage media, the image category list including a default category;
   means for accessing the image category list in order to display the images, wherein only the images belonging to the default category are displayed, thereby speeding access to, and display of, the images; and
   means for synchronizing the image category list with the images on the storage media when it has been determined that at least one image was deleted, added, or recategorized, wherein the means for synchronizing further include,
      automatically synchronizing the image category list when the storage media is under control of the digital imaging device, and
      performing the synchronization of the image category list after it has been determined that at least one image was deleted, added, or recategorized when the storage media was under control of an external device.

8. The system of claim 7 wherein the means for generating generates dynamic categories from the image categories.

9. The system of claim 8 wherein one of the tags indicates a date of image capture, the means for generating further including means for setting thresholds for the date to automatically create the dynamic categories.

10. The system of claim 9 wherein the dynamic categories include a recent category that displays N of latest images captured.

11. The system of claim 7 further including means for allowing a user to select a category in the image category list to change which images are being displayed.

12. The system of claim 11 further including means for allowing the user to change the default category.

13. A computer-readable medium containing program instructions for enhancing performance of a high-capacity storage media in a digital imaging device, the program instructions for:
   a) storing images on the storage media, the images including tags for categorizing the images;
   b) generating an image category list from the tags in the images and storing the image category list on the storage media, the image category list including a default category;
   c) accessing the image category list in order to display the images, wherein only the images belonging to the default category are displayed, thereby speeding access to, and display of, the images; and
   d) synchronizing the image category list with the images on the storage media when it has been determined that at least one image was deleted, added, or recategorized, wherein the synchronization includes,
      i) automatically synchronizing the image category list when the storage media is under control of the digital imaging device, and
      ii) performing a subsequent synchronization of the image category list after it has been determined that at least one image was deleted, added, or recategorized when the storage media was under control of an external device.

14. The computer-readable medium of claim 13 wherein program instruction b) further includes program instructions for generating dynamic categories from the tags.

15. The computer-readable medium of claim 14 wherein one of the tags indicates a date of image capture, program instruction a) further including program instructions for:

i) setting thresholds for the date to automatically create the dynamic categories.

16. The computer-readable medium of claim 15 wherein program instruction a) further includes program instructions for:

ii) providing a recent category that displays N of latest images captured.

17. The computer-readable medium of claim 13 further including program instructions for:

d) allowing a user to select a category in the category list to change which images are being displayed.

18. The computer-readable medium of claim 17 wherein step d) further includes program instructions for:

i) allowing the user to change the default category.

19. A method for enhancing performance of a high-capacity storage media in a digital imaging device, comprising:

a) storing images on the storage media, the images including tags for categorizing the images, wherein one of the tags indicates date and time of image capture;

b) generating an image category list from the tags in the images, the image category list including a default category;

c) storing the image category list on the storage media;

d) when displaying the images, accessing the category list and displaying only the images belonging to the default category;

e) automatically synchronizing the image category list with images on the storage media when images on the storage media are deleted, added, or recategorized while the storage media was under control of the digital imaging device; and f) requesting the user to initiate a synchronization of the image category list with the images on the storage media when it has been determined that images on the storage media were deleted, added, or recategorized while the storage media is under control of an external device.

* * * * *